US012114709B2

(12) United States Patent
Liu

(10) Patent No.: US 12,114,709 B2
(45) Date of Patent: Oct. 15, 2024

(54) ELECTRONIC CIGARETTES AND CONTROL DEVICES THEREOF

(71) Applicant: Smart Chip Microelectronic Co. Limited, Hong Kong (CN)

(72) Inventor: Loi Ying Liu, Hong Kong (CN)

(73) Assignee: SMART CHIP MICROELECTRONIC CO. LIMITED, Hong Kong (CN)

( * ) Notice: Subject to any disclaimer, the term of this patent is extended or adjusted under 35 U.S.C. 154(b) by 397 days.

(21) Appl. No.: 17/778,825

(22) PCT Filed: Oct. 15, 2021

(86) PCT No.: PCT/IB2021/059499
§ 371 (c)(1),
(2) Date: May 20, 2022

(87) PCT Pub. No.: WO2022/079679
PCT Pub. Date: Apr. 21, 2022

(65) Prior Publication Data

US 2023/0043467 A1 Feb. 9, 2023

(30) Foreign Application Priority Data

Oct. 15, 2020 (HK) .......................... 32020018169.3

(51) Int. Cl.

| | |
|---|---|
| ***A24F 40/57*** | (2020.01) |
| ***A24F 40/10*** | (2020.01) |
| ***A24F 40/46*** | (2020.01) |
| ***A24F 40/51*** | (2020.01) |
| ***A24F 40/53*** | (2020.01) |
| ***H05B 1/02*** | (2006.01) |

(52) U.S. Cl.
CPC .............. *A24F 40/57* (2020.01); *A24F 40/10* (2020.01); *A24F 40/46* (2020.01); *A24F 40/51* (2020.01); *A24F 40/53* (2020.01); *H05B 1/0252* (2013.01)

(58) Field of Classification Search
CPC .......... A24F 40/57; A24F 40/53; A24F 40/10; A24F 40/46; A24F 40/51; H05B 1/0252
USPC .......................................................... 131/328
See application file for complete search history.

(56) References Cited

U.S. PATENT DOCUMENTS

| | | | | |
|---|---|---|---|---|
| 10,398,176 | B2 * | 9/2019 | Hon | A24F 40/50 |
| 10,588,350 | B2 * | 3/2020 | Yu | A24F 40/44 |
| 11,395,514 | B2 * | 7/2022 | Yu | A24F 40/46 |
| 11,825,565 | B2 * | 11/2023 | Bellinger | A24F 40/53 |

* cited by examiner

*Primary Examiner* — Gary F Paumen

(57) ABSTRACT

A control device for controlling operation of a vaping apparatus. The control device comprises control circuitry to control activation of the vaping source, measurement circuitry to obtain a temperature-dependent parameter of the vaping source, and memory circuitry for data storage. The control device is configured to determine the ambient temperature, to obtain the parameter at the ambient temperature as an initial parameter, to set and store a target parameter for stopping activation of the vaping source, and to stop activation of the vaping source when the target parameter has been reached.

20 Claims, 6 Drawing Sheets

ELECTRONIC CIGARETTES AND CONTROL DEVICES THEREOF

FIELD

The present disclosure relates to electronic cigarettes, and more particularly to control devices of electronic cigarettes.

BACKGROUND

An electronic cigarette is an electronic device that is configured to facilitate simulated smoking by a user. A typical electronic cigarette comprises a main housing having an air-passageway interconnecting an air inlet and an air outlet, a flavor source which is in fluid communication with the air-passageway, a mouth piece which is provided to facilitate human-device interaction and which is in fluid communication with the air-outlet, and an ensemble of electronic circuitry which is to activate the flavor source so that a flavored fluid is delivered into the air-passageway when an activation signal is detected. To facilitate automated actuation to generate a flavored fluid, an electronic cigarette may comprise a puff sensor and a puff sensing circuitry to detect whether a puff corresponding to an actuation puff has appeared at the mouth piece. The flavored fluid is typically in the form of an aerosol, but may be in other fluid forms without loss of generality.

An electronic cigarette may be in the shape of a pen and may have dimensions comparable to a pen, but can be in other forms (for example, in the form of a smoking pipe) or other dimensions. An electronic cigarette typically comprises a heating element which is to heat up a flavor source, which is commonly known as a vaping source, to generate a flow of aerosols during operations, such operations are referred to as puffing operations herein. Aerosols generated in the course of puffing operations are in the form of fumes and are commonly but inaccurately called vapor. The heating element is commonly known as an atomizer since the generation of aerosols during puffing operations appears to involve an atomization process.

A vaping source typically comprises a flavored liquid which is transformed into a flavored, and usually visible, fume during puffing operations. Example vaping sources typically comprise a heating element and a wick which draws the vaping liquid to the heating element to facilitate fume generation. A flavored liquid for puffing operations is a vaping liquid which is commonly known as an e-liquid, an e-juice, etc., and typically comprises a base liquid plus flavorings, nicotine, and/or other additives. The base liquid may contain up to 95% propylene glycol and/or glycerin. A vaping liquid has a characteristic boiling point and it is desirable that the heater element operates at a maximum temperature which is not above or significantly above the boiling point.

A vaping source is a consumable and requires replenishment from time to time, since its contents diminish after each puffing operation. To facilitate convenient and expeditious replacement, vaping sources are available in packed forms, for example, in the forms of a cartridge or a capsule. Packaged vaping sources are commonly known as cartomizers, which stands for atomizers in a cartridge form.

It is desirable to have atomizers and/or control circuitry which are devised to mitigate over-temperature operation of vaping sources. As packaged vaping sources are designed for disposable use, it is highly desirable that only a minimal amount of electronics is included in packaged vaping sources to minimize waste.

However, there are currently no accepted industrial standards on vaping sources, let alone standards on heating elements of vaping sources. Replacement vaping sources from different brands or sources have heating elements which are made of different materials and which have different electrical characteristics such as different resistances and different temperature coefficients of resistance.

Devising temperature monitoring schemes subject to the requirements that the packaged vaping sources should have minimal on-package electronics plus that the resistances and the temperature coefficients of resistance are variable is a technical challenge.

SUMMARY OF DISCLOSURE

A control device of an electronic cigarette and method for controlling operation of an electronic cigarette is disclosed.

The electronic cigarette comprises a packaged flavor source having a built-in heating element, the heating element comprising a heating resistor (R2). The control device comprises electronic circuitry which is configured to control operation of the resistive heating element.

The electronic circuitry is configured and the method comprises the electronic circuitry operating:

- to supply an actuation power from a first power supply circuit to the heating element via a first path (131) and a first terminal (141);
- to transmit a reference signal having a reference voltage ($V_{REF}$) to the heating element via the first terminal (141) and a second path (133) and to receive a responsive signal having a responsive voltage ($V_{OUT1}$) at the first terminal (141) when the first path is electrically isolated from the first power supply circuit, wherein the responsive voltage is a fraction equal to a ratio ($R_{RATIO}$) of the responsive voltage ($V_{OUT1}$) to the reference voltage ($V_{REF}$); and
- to determine whether the resistive heating element is at a threshold operation temperature with reference to the ratio.

A control device for controlling operation of a vaping apparatus, a vaping apparatus comprising the control device, and a vaping source configured for cooperation with the control device are disclosed. The vaping source may be configured for detachable connection with the control device.

The vaping source has a preferred operation temperature which is referred to as a target temperature. The control device is configured to control operation of the vaping source at or below the target temperature, which may be the boiling point of the vaping liquid held inside the vaping source.

The control device is configured to operate at an ambient temperature and comprises control circuitry to control activation of the vaping source, measurement circuitry to obtain a temperature-dependent parameter of the vaping source, and memory circuitry for data storage;

The control device is configured to determine the ambient temperature, to obtain the parameter at the ambient temperature as an initial parameter, to set and store a target parameter for stopping activation of the vaping source, and to stop activation of the vaping source when the target parameter has been reached.

The target parameter is related to the initial parameter and a target temperature set for operation of the vaping source.

A method of controlling operation of a vaping apparatus is disclosed. The vaping apparatus comprises a control device which is configured for operation at an ambient temperature and a vaping source which is detachably connected to the control device and which is configured to operate at a target temperature or below.

The method comprises the control device:

sending an initial inquiry signal to the vaping source prior to activation of the vaping source and receiving an initial responsive signal therefrom;

setting a target parameter based on the initial signal magnitude, the ambient temperature, and the target temperature;

sending a subsequent inquiry signal to the vaping source after the vaping source has entered into activation and receiving a subsequent responsive signal having therefrom;

determining with reference to the responsive electrical signal and the target parameter whether the vaping source has reached the target temperature; and not to activate the vaping source if the vaping source has reached the target temperature.

The control device is configured to send the subsequent inquiry signal after a previous activation cycle has ended and to determine whether to stop or enable activation before a next activation cycle is to begin.

DESCRIPTION OF FIGURES

The present disclosure is described with reference to the accompanying figures, in which.

DESCRIPTION OF EMBODIMENTS

Figure 1:
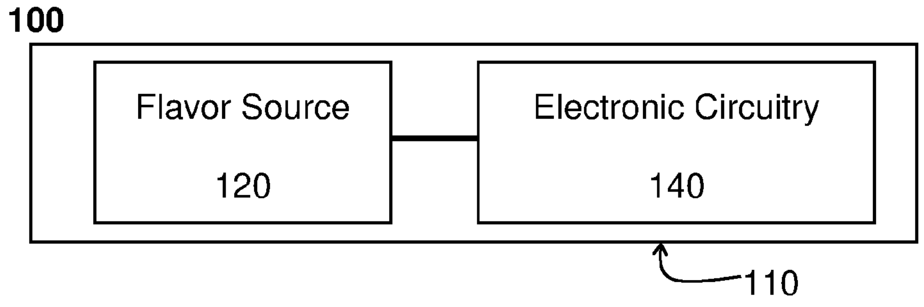
FIG. 1 is a block diagram of an example vaping apparatus.

An example electronic cigarette 100 comprises a main housing 110, a flavor source 120, an ensemble of electronic circuitry 140 and, as shown in FIG. 1. The electronic cigarette 100 comprises a battery (not shown) as a power source for proving power to operate the electronic cigarette 100. The battery as an example of a portable power source is typically a rechargeable battery, for example, a lithium battery. The flavor source 120 is a packaged device which is configured, for example, as a cartomizer. The packaged flavor source 120 comprises a resistive heating element having a pair of contact terminals for making releasable electrical connection with the electronic circuitry 140.

The main housing 110 comprises an internal compartment which is configured to house the flavor source 120 and the electronic circuitry 140, an air-passageway which interconnects an air-inlet and an air-outlet, and a mouth piece which is in fluid communication with the air-outlet. The main housing 110 comprises a receptacle which is configured for snap-fitted reception of the flavor source 120. The receptacle is a cartridge receptacle disposed with electrical contact terminals. The contact terminals are configured to enter into electrical connection with corresponding electrical contact terminals on the flavor source 120 when the flavor source 120 is duly fitted inside the cartridge receptacle.

An electronic cigarette may be configured to resemble the look and feel of a conventional cigarette and has a shape and dimensions comparable to those of a conventional cigarette. The shape and dimensions of an electronic cigarette are largely determined by its main housing and typical electronic cigarettes have an elongate main housing, with the air-inlet and the air-outlet disposed at or near its longitudinal ends. Typical electronic cigarettes are configured to operate at an elevated temperature of above 100 degrees Celsius and the flavor source is thermally isolated from the main housing, especially portions which are exposed to a user to mitigate risks of burns.

The electronic circuitry comprises a puff detection circuit which is arranged to detect occurrence of an effective puff and to generate an actuation signal when an effective puff is detected. An effective puff means a suction puff reaching a threshold suction magnitude corresponding to a smoke request has occurred at the month piece. The threshold suction magnitude may be manually set or machine-learned to meet personal preferences. When an effective puff is detected by the electronic circuitry, the electronic circuitry will generate an actuation signal to actuate the flavor source and actuation of the flavor source will result in discharge of a flavored fluid into the air-passageway. The flavored fluid will move along the air-passageway to reach the mouth piece and then the user who is generating the effective puff at the mouth piece.

The puff detection circuit comprises a puff sensor which is configured to generate a responsive signal on encountering a puff, and the responsive signal may have a signal magnitude which is commensurate with the magnitude of the puff. The puff sensor may comprise a detection surface which is disposed inside or near the air-passageway and the magnitude of the responsive signal may be commensurate with the flow rate of air inside the air-passageway. In some embodiments, the puff sensor is a capacitive sensor and the detection surface is to deform on encountering an airflow resulting from a suction action at the mouth piece and the extent of deformation may vary according to the magnitude of the airflow, which represents the airflow rate. The responsive signal may be the capacitance value of the sensor, measured between two terminals, and the puff detection circuit may comprise a decision circuit to determine whether an effective puff has been detected with reference to the instantaneous capacitance value of the puff sensor.

The electronic circuitry comprises a temperature sensing arrangement to monitor temperature of the heating element to mitigate risks of over-temperature operations. An example electronic circuitry comprises a controller and peripheral circuits which cooperate to form a measurement and control circuitry. The controller may be microprocessor-based and/or may comprise an ensemble of logic circuits. The peripheral circuits may comprise a puff sensor, a plurality of analogue-to-digital converters (ADC), plus other peripheral components including active or passive components. The controller and peripheral circuits may be mounted on a printed circuit board to form an electronic module, although components of the electronic circuitry may be mounted on separate boards where appropriate. The controller in this example is an integrally packaged device having a plurality of contact terminals, although the controller may comprise a plurality of discrete components.

The electronic module 140 comprises a main printed circuit board (PCB) having a circuit ground, an integrated circuit U1, and a plurality of discrete components mounted on the PCB. The packaged integrated circuit may be an application specific integrated circuit (ASIC) comprising a controller and peripheral circuits including, for example, voltage regulators and ADCs.

Figure 2:
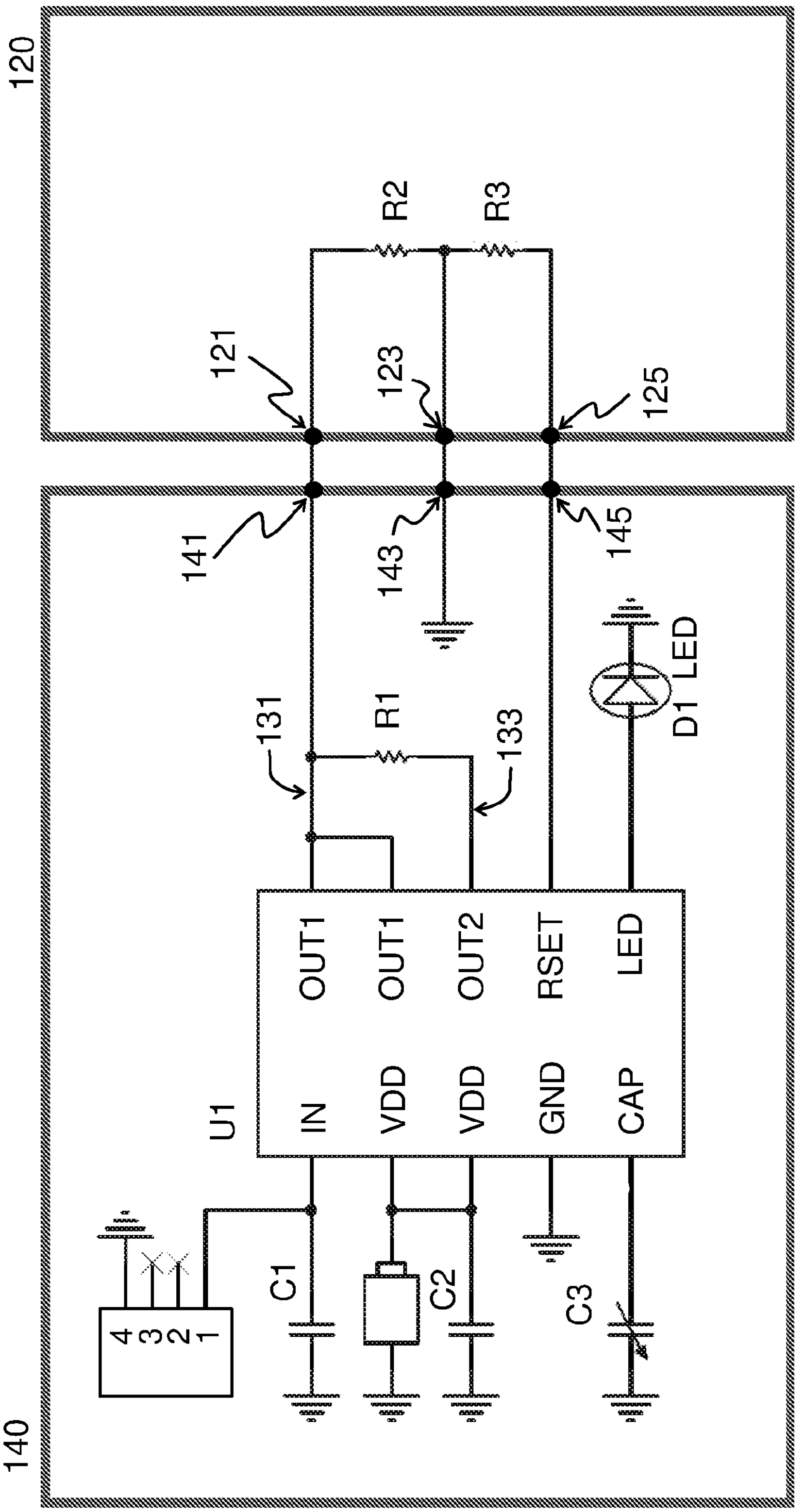
FIG. 2 is a block diagram of an example control module and an example vaping source in physical and electrical connection.

Referring to FIG. 2, the example integrated circuit U1 comprises a node IN which is connected to a power connector, a node VDD which is connected to the power source, a node GND which is connected to the circuit ground, a node CAP which is connected to a sensor output terminal, a node OUT1 which is connected to a first terminal 141 of the electronic module 140, a node OUT2 which is connected to the node OUT1 by a resistor R1, a node RSET which is connected to a third terminal 145 of the electronic module 140, and a node LED which is connected to a terminal of a light emitting diode (LED). Two nodes of the IC U1 are marked with the same numeral OUT1 to symbolize that the two nodes are connected in parallel to facilitate supply of a rated current. The rated current is a large current in the magnitude of ampere or amperes which is supplied from the power source to the flavor source to facilitate fume generation by the vaping source on demand of a user.

The power connector is configured for making detachable electrical connection with an external power supply so that the power source can be recharged. The example power connector is a USB connector comprising four pins of which pin number 1 is connected to the IN node and pin number 4 is connected to the circuit ground, that is, grounded. As shown in FIG. 2, a stabilizing capacitor C1 for stabilizing input power at the power connector is connected between the IN node and the circuit ground, a lithium battery and a stabilizing capacitor C2 are connected between the node VDD and the circuit ground, a capacitor sensor C3 is connected between the sensor node CAP and the circuit ground, a resistor R1 interconnects the nodes OUT1 and OUT2, and a light emitting diode (LED) is connected between the node LED and the circuit ground to provide visible indication to a user.

The electronic module 140 comprises a first terminal 141 which is electrically connected to the node OUT1 by a current path 131, a second terminal 143 which is a ground terminal connected to the circuit ground, and a third terminal 145 which is an optional terminal. The first terminal 141, the second terminal 143, and the optional third terminal 145 are interfacing terminals which are configured for making electrical connection with corresponding interfacing terminals on the flavor source 120. The current path 131, which is a first electrical path, has a very low impedance so that the first terminal 141 and the node OUT1 are at same electrical potential. The first terminal 141 and the node OUT2 are interconnected by a resistor R1, which forms a second electrical path 133. The optional third terminal 145 is connected to the node RSET by a very low impedance electrical path.

Resistor R1 is devised as a reference resistor which is on-board the electronic module and resistor R2 is an integral part of the vaping source. When the vaping source is duly installed on the main housing, resistor R1 and resistor R2 are electrically connected in series and cooperate to form a resistor bridge. Resistor R1 is an upstream resistor of the resistor bridge having an upstream terminal connected to the node OUT2 and a downstream terminal connected to the first terminal 141. Resistor R2 is a downstream resistor of the resistor bridge having an upstream terminal connected to the first terminal 121 and a downstream terminal connected to the first terminal 121 and the circuit ground via the second terminal 143.

When the vaping source is detached from the main housing, the interfacing terminals 121, 123, 125 on the flavor source 120 and the corresponding interfacing terminals on the 141, 143, 145 on the electronic module 140 are no longer in electrical contact and resistor R1 and resistor R2 no longer cooperate to form a resistor bridge. The term "electrical contact" herein means a contact having no or no noticeable contact resistance.

The controller is configured to monitor signal output of the puff sensor C3 and to determine whether an effective puff has occurred. To facilitate signal detection, an output node of the puff sensor is connected to an input node of the controller, for example, by means of an ADC so that analog output signals of the puff sensor can be processed by the controller. In other embodiments, the puff sensor may be a digital sensor having a digital data output so that data output of the puff sensor can be directly processed by the controller.

The electronic circuitry comprises a first power supply circuit which is configured to supply power to operate the heater and a second power supply circuit which is configured to supply measurement signals to the measurement circuits.

Figure 3:
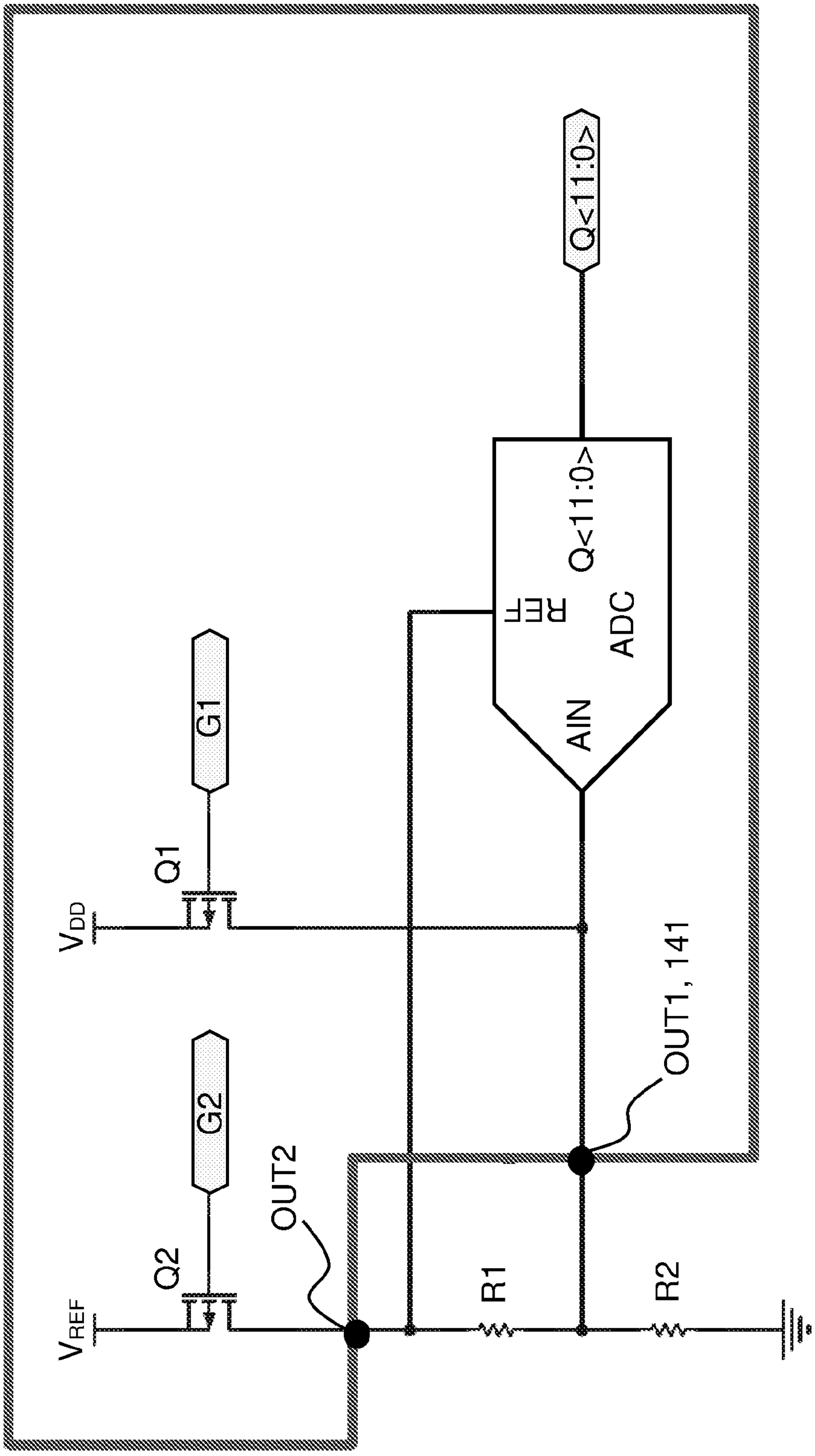
FIG. 3 is a schematic diagram showing interconnection between the heating element of a vaping source and the control module.

Referring to FIG. 3, the first power supply circuit comprises a first switch Q1 which connects the node OUT1 to a first power supply. The first power supply is a voltage source which is set at a first voltage $V_{DD}$. The first switch Q1 is to operate between a first state which is an on-state and a second state which is an off-state. When the first switch Q1 is in the on-state, which is a state of very low impedance, node OUT1 is electrically connected to the first power supply by a very low impedance current path and is at the first voltage $V_{DD}$.

When the first switch Q1 is in its on-state, node OUT1 and the first terminal 141 are at the voltage $V_{DD}$ and a potential difference $V_{DD}$ appears across the heating resistor R2. As a result, a rated current which is sufficient to actuate the heating element to generate vaping fumes will flow through the heating resistor R2. Specifically, the rated current is to flow from the first power supply to the heating resistor R2 and then back to the circuit ground of the electronic module 140 via node OUT1, first terminal 141, first terminal 121, second terminal 123 and second terminal 143. Node OUT1 is a power output node when the first switch Q1 is in the on-state. When the first switch Q1 is in its off-state, which is a high impedance state, there is a very high impedance between the first power supply and node OUT1, as a result node OUT1 and the first terminal 141 are electrically isolated from the first power supply. The controller is configured to operate the first switch Q1 via a control bus G1 between the on-state when in a power supply mode, and the off-state when in a non-power-supply mode. Node OUT1 is a floating node when the controller is in the non-power-supply mode.

The second power supply circuit comprises a second switch Q2 which connects the node OUT2 to a second power supply. The second power supply is a voltage source which is set at a second voltage $V_{REF}$. The second switch Q2 is to operate between a first state which is an on-state and a second state which is an off-state. When the second switch Q2 is in the on-state, which is a state of very low impedance, node OUT2 is electrically connected to the second power supply by a very low impedance current path and is at the second voltage $V_{REF}$.

When the second switch Q2 is in its on-state, node OUT2 is at the second voltage $V_{REF}$, and a voltage drop of $V_{REF}$ will appear across the resistor bridge consisting of resistor R1 and resistor R2 in series connection. When the second switch Q2 is in its off-state, which is a high impedance state, there is a very high impedance between the second power supply and node OUT2, as a result node OUT2 is electrically isolated from the second power supply. The controller is configured to operate the second switch Q2 via a second control bus G2 between the on-state when in a measurement mode and the off-state when in a non-measurement mode. When the controller is in the non-measurement mode, resistor becomes a floating resistor, with its upstream terminal being a floating terminal.

Resistor R1 is a reference resistor having known or selected electrical characteristics, including a known resistance value at a reference temperature or a plurality of known resistance values at a plurality of reference temperatures, and a known temperature coefficient of resistance.

The controller is configured such that when the first switch Q1 is in its on-state, the second switch Q2 is in its off-state. The controller is also configured such that when the second switch Q2 is in its on-state, the first switch Q1 is in its off-state. The controller may be configured so that the first switch Q1 and the second switch Q2 are both in the off-state.

When the controller operates in the measurement mode so that the second switch Q2 is in its on-state and the first switch Q1 is in its off-state, node OUT2 is at the reference voltage $V_{REF}$, and node OUT1 is at voltage $V_{OUT1}$ which is at a fraction of $V_{REF}$. That is, $V_{OUT1}=R_{RATIO}\times V_{REF}$, where the fraction $R_{RATIO}$ is a ratio equal to $R_2/(R_1+R_2)$, where $R_2$ is the resistance value of resistor R2 and $R_1$ is the resistance value of resistor R1.

The resistance value $R_2$ is related to the resistance value $R_1$ and the ratio by the expression $R_2=(R_1R_{RATIO})/(1-R_{RATIO})$.

The electronic circuitry comprises a measurement circuit which is configured to measure $V_{OUT1}$. Since the reference voltage $V_{REF}$ is known or preset, the controller would be able to get the value of the fraction using the relationship: $R_{RATIO}=V_{OUT1}/V_{REF}$.

An example measurement circuit comprises an ADC, as shown in FIG. 3. The controller is configured to take voltage readings $V_{OUT1}$ at node OUT1 when the first switch Q1 is in its off state.

Figure 5A:
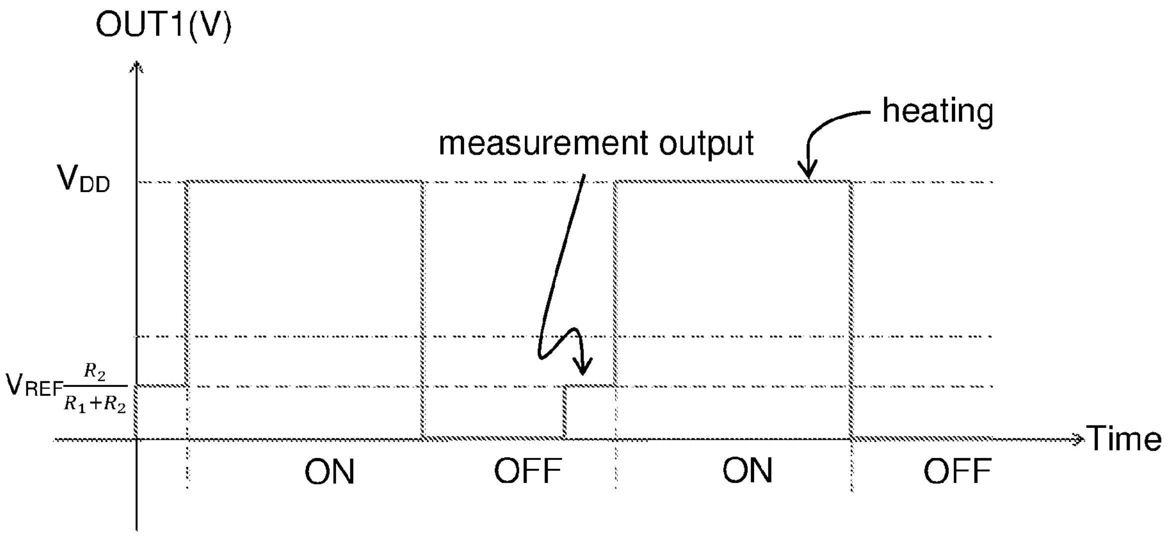
FIGS. 5A and 5B show example voltage waveforms at internal nodes OUT1 and OUT2 of the control module.

During operation of the electronic cigarette when an effective puff is detected, the controller will enter the power supply mode and turn on the first switch to supply actuation current to the flavor source 120. When in the power supply mode, the controller will turn on the first switch Q1 at selected intervals to supply a rated current to the heating resistor R2 of the flavor source 120. When in this power supply mode, a train of voltage pulses each having a voltage magnitude $V_{DD}$ will appear at node OUT1. A voltage pulse having a voltage magnitude $V_{DD}$ at node OUT1 is referred to as an "ON" pulse, as shown in FIG. 5A.

The controller may be configured to actuate the heating element by sending a train of PWM pulses. The train of PWM pulses has a characteristic PWM cycle and comprises ON-pulses which are activation pulses at $V_{DD}$ and off-pulses which are non-activation pulses.

The controller is configured to send measurement signals and to receive response signals to obtain temperature information of the heater element of the flavor source 120 at times when the first switch Q1 is in its off state, that is, at time gaps between adjacent ON pulses. When the first switch Q1 is in its off state, node OUT1 is isolated from the first power supply.

Figure 5B:
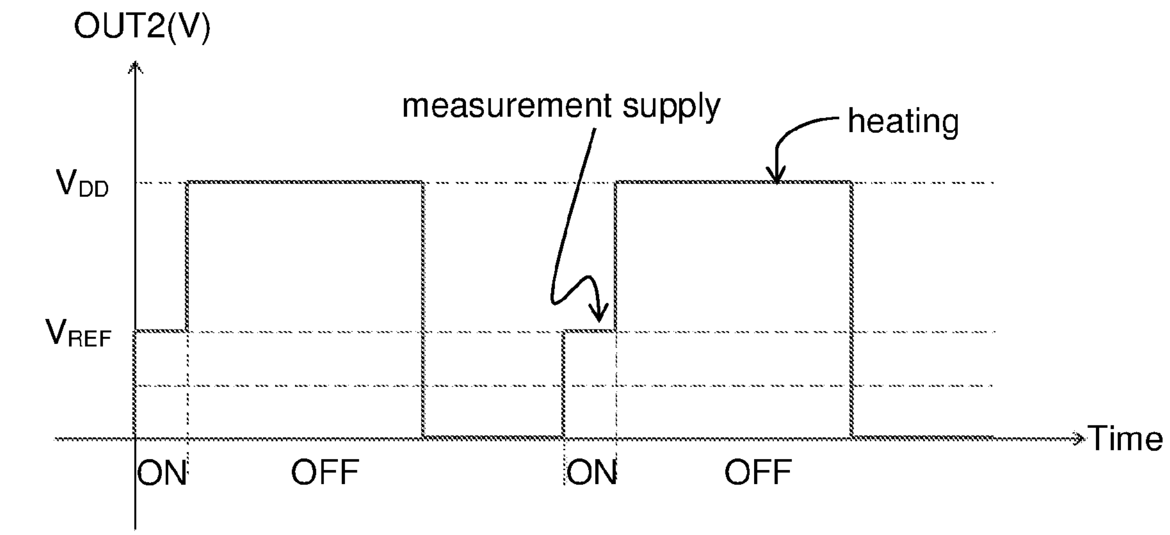
Figure 6:
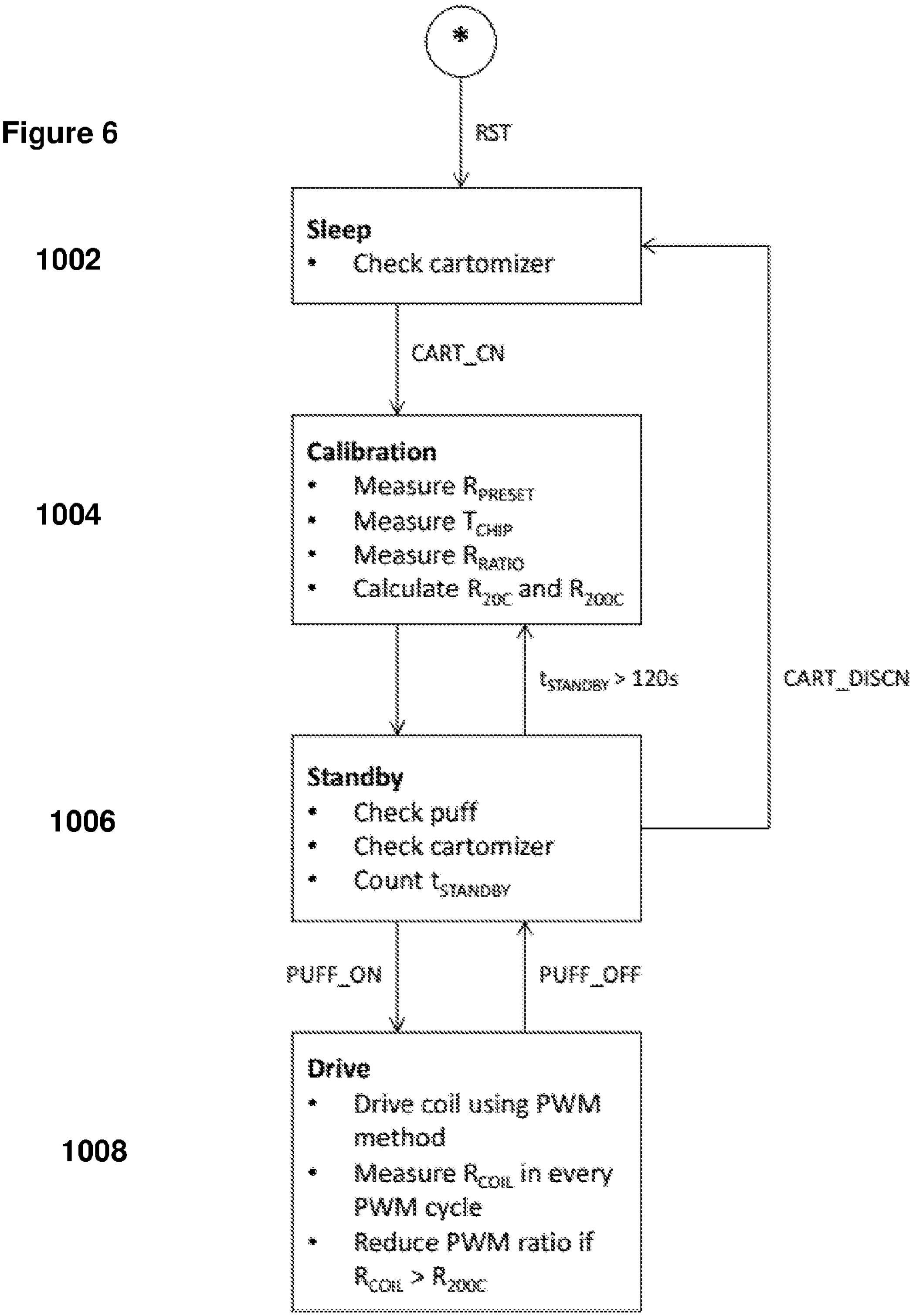
FIG. 6 shows an example flow diagram of an example flow of a method according to the disclosure.

The controller is configured to send measurement signals to the heater element when the first switch Q1 is in its off state by turning on the second switch Q2. When the second switch Q2 is turned on and in its on state, the second voltage $V_{REF}$ will appear at node OUT2, as shown in FIG. 5B. The second voltage $V_{REF}$ at node OUT2 has a corresponding measurement voltage $V_{REF}\times R_{RATIO}$ at node OUT1, as shown in FIG. 5A. The corresponding measurement voltage $V_{REF}\times R_{RATIO}$ is a responsive signal to the measurement signal $V_{REF}$, and each measurement signal is configured as a probing pulse having a probing voltage $V_{REF}$ and a short duration compared to the duration of an ON pulse.

The ON pulses which are heater actuation pulses are set to the first voltage $V_{DD}$, so that the flavor source can react expeditiously with fume generation on detection of a valid puff, which is an effective puff. In general, an ON pulse at the first voltage $V_{DD}$ has a substantially longer duration than a measurement pulse. A measurement pulse has a voltage $V_{REF}$ at node OUT2 and the magnitude of $V_{REF}$ is substantially lower than the magnitude of $V_{DD}$.

An example probing pulse is set at $V_{REF}$=1.8V and with a probing duration of 1/256 of a PWM cycle duration. An actuation pulse may be set at a $V_{DD}$ of between 3.2V and 4.2V and may have a pulse duration of between 1/256 and 255/256 PWM cycle duration. The probing pulse has a first duration and the activation voltage has a second duration which is longer than the first duration. The second duration can be 1 to 255 times the first duration, and can be for example, more than 100 times, for example, 100 to 255 times. In general, a probing pulse having a pulse duration which is less than 10%, 8%, 6%, 4%, or 2% the duration of an actuation pulse coupled with a substantially lower voltage than the activation voltage would facilitate good measurement of the heating element without noticeably affecting its temperature. The probing voltage $V_{REF}$ may be set at between 10% of 50% the activation voltage $V_{DD}$. The activation voltage may be in the range of 3V-12V, and is between 3V-5V in example embodiments.

The resistance of a resistor changes with temperature. More specifically, the resistance of a resistor at an elevated temperature T is given by the relationship: $R_T=R_{T\_base}(1+\alpha(T-T_{base}))$, where $R_T$ is the resistance value at the elevated temperature T, $R_{T\_base}$ is the resistance of the resistor at a base temperature, $T_{base}$ is a base temperature, and $\alpha$ is the temperature coefficient of resistance at the base temperature.

The heating element of a vaping source is typically a resistor made of metal. Example temperature coefficients of metals which are commonly used as heating elements of a vaping source are set out in Table 1 below.

TABLE 1

| Material | Resistance at 200° C. (Ω) | % Change in resistance | Temperature Coefficient (ppm/° C.) at 20° C. |
|---|---|---|---|
| Nichrome N80 | 1.01957 | 1.96% | 109 |
| SS316 | 1.16780 | 16.78% | 93 |
| SS316 Elite | 1.16800 | 16.80% | 933 |
| SS317L Haywire | 1.16920 | 16.92% | 940 |
| Ni200 (Curve) | 1.92271 | 92.30% | 5120 |
| Ni200 (TCR) | 2.08000 | 108.00% | 6000 |

The instantaneous temperature T of the resistor R2 of the heating element can be obtained from the relationships below:

$$R_{2@T}=R_{2@Tbase}(1+\alpha(T-T_{base})),$$

$$R_{1@Tambient}=R_{1@Tbase1}(1+\beta(T_{ambient}-T_{base1})),\text{ and}$$

$$R_{2@T}=(R_{1@Tambient}R_{RATIO})/(1-R_{RATIO}).$$

where, $R_{2@T}$ is resistance value of the resistor R2 at the instantaneous temperature T, $R_{2@Tbase}$ is resistance value of the resistor R2 at a base temperature $T_{base}$, α is temperature coefficient of resistance of R2 at the base temperature $T_{base}$, β is temperature coefficient of resistance of R1 at the base temperature $T_{base1}$, $T_{ambient}$ is ambient temperature of the electronic module, $R_{1@Tambient}$ is resistance value of the reference resistor R1 at the ambient temperature $T_{ambient}$, and $R_{RATIO}$ equals $R_{2@T}/(R_{1@Tambient}+R_{2@T})$.

In the above relationships, the base temperatures $T_{base}$ and $T_{base1}$ may be the same or different. The resistance value of the reference resistor R1 which appears in the above relationships is its resistance value at the ambient temperature $T_{ambient}$, since the reference resistor R1 is thermally insulated from the heating element R2 by design, and the temperature of the reference resistor R1 would be equal to the ambient temperature $T_{ambient}$ of the electronic module, which is also taken as the ambient temperature of the main housing. The ambient temperature may be measured by a temperature sensor. The temperature sensor may be a bandgap device, for example, a diode or a semiconductor device comprising a p-n junction having a forward voltage drop which increases linearly with temperature.

Figure 4:
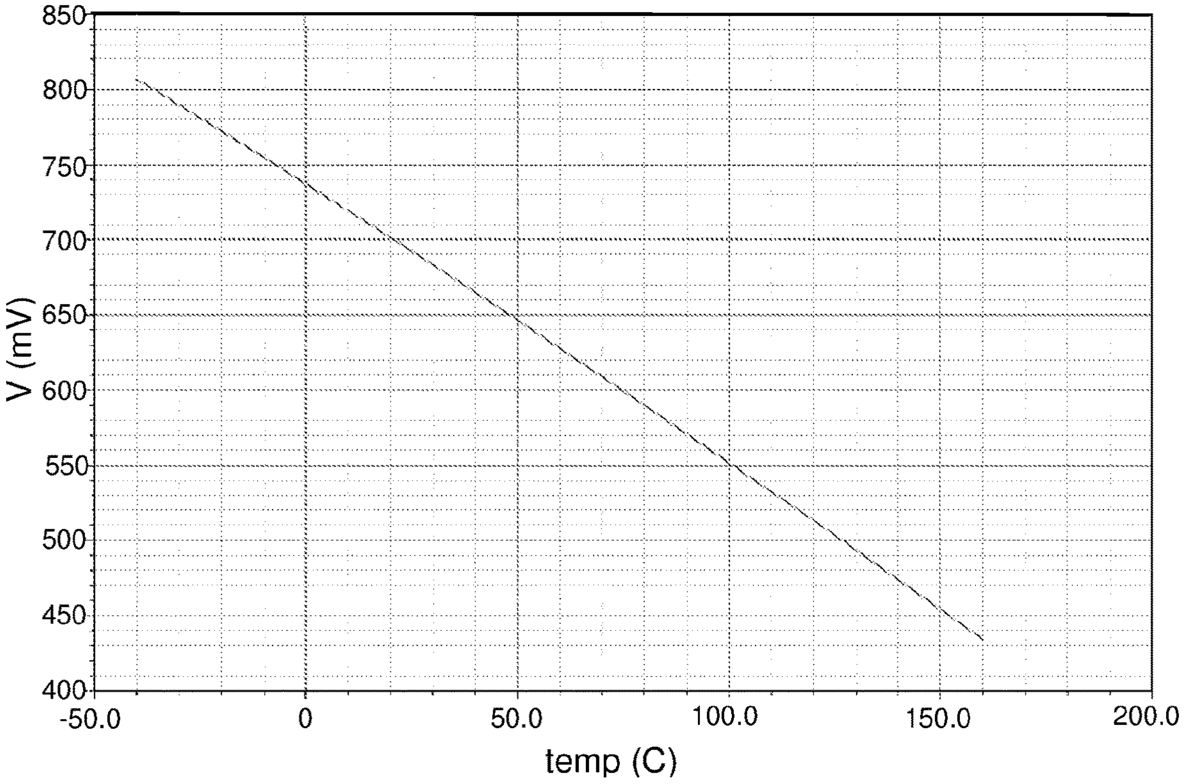
FIG. 4 is a diagram showing a relationship between forward voltage drop of a p-n junction and temperature.

Referring to FIG. 4, the forward voltage of a p-n junction in a silicon integrated circuit has forward voltage (Y-axis) and temperature characteristics as shown. By measuring the forward voltage drop, the temperature of the integrated circuit can be quite accurately determined.

Since the resistance value of the reference resistor R1 at a base temperature $T_{base1}$ is known by way of design, the ambient temperature $T_{ambient}$ is measured by the controller using the temperature sensor, its temperature coefficient of resistance β is known, the resistance value of the reference resistor R1 at the ambient temperature $T_{ambient}$ could be easily calculated by the controller, for example, by the arithmetic units of the controller.

Once $R_{1@Tambient}$ is known, the resistance value $R_{2@T}$ of the resistor R2 at the instantaneous temperature T and hence the instantaneous temperature T can be determined by the controller, for example, by the arithmetic units of the controller.

The controller may be configured to stop or temporarily stop sending actuation current to the heating element or to reduce the current supply to below the rated current, for example, by adjusting PWM pulse widths upon determination that the instantaneous temperature T of the heating element is above a predetermined temperature which is at or above a threshold temperature.

In the example embodiments, the controller is configured to take a measurement immediately preceding an actuation or ON pulse, and the controller may be configured to not to turn on the first switch Q1 or shorten the duration of the ON-pulses, if the outcome of measurement indicates over-temperature of the heater element.

On the other hand, the controller may be configured so that if the instantaneous temperature T of the heating element is below a target operating temperature, the controller may increase the duration of the ON-pulses.

The electronic circuitry comprises a hard-wired circuit arrangement which is configured to measure the value of $R_{RATIO}$ directly to simplify processing and determination of the instantaneous temperature T of the heating element, as shown in FIG. 3. Once the value of $R_{RATIO}$ is known, the instantaneous temperature T of the heating element can be readily determined.

Referring to FIG. 3, the ADC has an analog input AIN which is configured to measure an analog voltage which is between 0V and $V_{REF}$, by connecting the power supply node REF of the ADC to node OUT2 so that the maximum voltage that can be determined by the ADC is $V_{REF}$. By connecting the analog input AIN to node OUT1 and its power supply node to node OUT1, the value of the data output by the ADC would be a value equal to $R_{RATIO}$. Such an arrangement greatly simplifies processing as a single reading of the ADC would readily provide the ratio $R_{RATIO}$.

In example embodiments, the digital value of the input voltage to be outputted from the output terminal Q<11:0> of the ADC is digitally coded with respect to the reference voltage. For example, the output data may be linearly coded such that it carries a value representing the ratio of the input voltage at the input terminal AIN to the reference voltage $V_{REF}$. For example, where the ADC has 1024 digital output levels, output values of 256, 512, and 768 would mean, respectively, that the input voltage is at 25%, 50%, and 75% the value of the reference voltage, and the value of the ratio $R_{RATIO}$ is, respectively, 25%, 50%, and 75%. Of course, the ADC may be non-linearly coded and the ratio can be determined with reference to a decoding table such as a decoding database.

For example, an example heating element made of SS316L has a temperature coefficient of 933 ppm/° C. and a stated resistance of 1 ohm 20 degrees Celsius. When the ambient temperature is known, for example by measuring the p-n junction forward voltage drop, the resistance of the heating element, and therefore $V_{FB}$ (that is, $V_{OUT1}$) and/or $R_{RATIO}$ at the target temperature can be readily computed by the control module. For example, if a control resistor of 1 ohm is selected, the heating element will have a resistance of 1.168 ohm and therefore a $R_{RATIO}$ of $$\frac{1.168}{1+1.168}$$

when the heating element has reached an example target temperature of 200 degrees Celsius, and then the example $R_{RATIO}$ of $$\frac{1.168}{1+1.168}$$

may be set as a threshold value to not to turn on the heating element into the activation mode until the temperature of the heating element drops to below the target temperature.

In example embodiments, the resistance values of the heating element and/or $R_{RATIO}$ at a plurality of temperatures may be set after calibration has been performed at an ambient temperature.

For example, an example $R_{RATIO}$ of 0.5 measured at an example ambient temperature of 30 degrees Celsius may be used to set out the resistance values of the heating element and the $R_{RATIO}$ at different temperatures, as shown in Table 2 below.

TABLE 2

| | |
|---|---|
| Control Resistance (Ω) | 1.000 |
| Heater Resistance at 30° C. (Ω) | 1.000 |
| Heater Resistance at 20° C. (Ω) | 0.991 |
| Heater Resistance at 200° C. (Ω) | 1.157 |
| Ladder Ratio ($R_{RATIO}$) at 200° C. (Ω/Ω) | 0.536 |

After calibration at ambient temperature has been done, the control module is to measure the temperature information of the heater element during activation mode operations. If the temperature is determined to be at or near the target temperature, the control module may be configured to react by reducing the on-duration of the activation pulse to maintain the heating element at an acceptable operation temperature range.

Where a new vaping source is installed, the ambient-temperature calibration process would facilitate automatic reset and update of the decision parameter. For example, after a new vaping source has been mounted and the vaping apparatus is to begin operation at an ambient temperature of, say 35 degrees Celsius, an $R_{RATIO}$ of 0.667 is measured. The ratio $R_{RATIO}$ may be used to calculate or set a decision parameter as shown in Table 3 below.

TABLE 3

| | |
|---|---|
| Control Resistance (Ω) | 1.000 |
| Heater Resistance at 30° C. (Ω) | 2.000 |
| Heater Resistance at 20° C. (Ω) | 1.972 |
| Heater Resistance at 200° C. (Ω) | 2.304 |
| Ladder Ratio ($R_{RATIO}$) at 200° C. (Ω/Ω) | 0.697 |

A vaping source may have a preferred working temperature which may be set as a target temperature. For example, a vaping source may have a preferred target temperature depending on the composition of the vaping liquid.

Example vaping liquids have different boiling points, as shown in Table 4 below and it would be advantageous to keep the heating element to operate at a target temperature which corresponds to the boiling point temperature.

TABLE 4

| Flavor of e-liquid | Vaporization Point |
|---|---|
| orange | 200° C. |
| apple | 200° C. |
| mint | 160° C. |
| original | 220° C. |

In order to provide a vaping source with an identification, the vaping source may comprise an identification means. An example identification means may be by means of a resistor, for example, the preset resistor R3. The preset resistor may have different resistance values to facilitate identification. For example, a resistance value of 1 kΩ may represent a boiling point of 160° C., a resistance value of 2 kΩ may represent a boiling point of 180° C., a resistance value of 3 kΩ may represent a boiling point of 200° C., and a resistance value of 4 kΩ may represent a boiling point of 240° C. Of course, the resistance value of the preset resistor and the boiling may be selected to have other correspondence without loss of generality.

To facilitate determination of identity of a vaping source mounted on the vaping apparatus, the control module is configured to identify the identification means and to set and store a target temperature.

In example embodiments, the identification means may be configured to provide coded information on the target temperature, material, and/or resistivity temperature coefficient of the material for use by the control module.

In example embodiment, the identification means may be configured by a mechanical means. For example, the cartridge receptacle and the cartridge may have matching mechanical means to provide information to the controller in relation to the electrical characteristics of the flavor source.

While the present disclosure has been made with reference to embodiments and examples described herein, it should be appreciated that the embodiments and examples are non-limiting and should not be construed to limit the scope of disclosure.

The invention claimed is:

1. A control device of an electronic cigarette, wherein the electronic cigarette comprises a packaged flavor source having a built-in heating element, the heating element comprising a heating resistor (R2), wherein the control device comprises electronic circuitry which is configured to control operation of the resistive heating element; wherein the electronic circuitry is configured:

to supply an actuation power from a first power supply circuit to the heating element via a first path (131) and a first terminal (141);

to transmit a reference signal having a reference voltage ($V_{REF}$) to the heating element via the first terminal (141) and a second path (133) and to receive a responsive signal having a responsive voltage ($V_{OUT1}$) at the first terminal (141) when the first path is electrically isolated from the first power supply circuit, wherein the responsive voltage is a fraction equal to a ratio ($R_{RATIO}$) of the responsive voltage ($V_{OUT1}$) to the reference voltage ($V_{REF}$); and to determine whether the resistive heating element is at a threshold operation temperature with reference to the ratio.

2. The control device of claim 1, wherein the electronic circuitry comprises a second power supply circuit which is configured to generate the reference signal, and wherein the first path (131) and the first terminal (141) are isolated from the second power supply circuit when the actuation power is to flow from the first power supply circuit to the heating element.

3. The control device according to claim 1, wherein the second path (133) comprises a reference resistor (R1) having a reference resistance value $R_1$, the reference resistor having a downstream end connected to the first terminal (141); wherein the heating resistor (R2) is a second resistor having a second resistance value $R_2$; and wherein the ratio ($R_{RATIO}$) is equal to $$\frac{R_2}{R_1 + R_2}.$$

4. The control device according to claim 3, wherein the electronic circuitry is thermally isolated from the resistive heating element and the reference resistor (R2) is configured to operate at ambient temperature, the ambient temperature being substantially lower than the threshold operation temperature.

5. The control device according to claim 1, wherein the electronic circuitry is configured to supply heater actuation power after completion of ratio determination.

6. The control device according to claim 1, wherein the electronic circuitry is configured to determine that the resistive heating element is at or above the threshold operation temperature respectively when the ratio ($R_{RATIO}$) is at or above a threshold ratio.

7. The control device according to claim 1, wherein the electronic circuitry comprises a first node (OUT1) which connects the first power supply circuit to the first terminal (141) and a second node (OUT2) which connects the second power supply circuit to the reference resistor (R1); and wherein the reference resistor (R1) interconnects the first node (OUT1) and the second node (OUT2).

8. The control device according to claim 1, wherein the electronic circuitry comprises an analog-to-digital converter ADC having an analog signal input (AIN) which is configured to take voltage readings at the first terminal (141), and wherein the ADC is configured to receive a responsive signal having a responsive voltage which is between a maximum value equal to the reference voltage ($V_{REF}$) and a minimum value equal to zero volt.

9. The control device according to claim 8, wherein the ADC comprises a digital data output which is configured to output the ratio ($R_{RATIO}$), and the electronic circuitry is configured to determine whether the heating element is at or above the threshold operation temperature based on the ratio.

10. The control device according to claim 1, wherein the electronic circuitry is configured to operate the first power supply circuit to supply actuation power in the form of a train of actuation pulses, wherein an actuation pulse has a first voltage $V_{DD}$ which is higher than the reference voltage ($V_{REF}$) and an actuation pulse duration, and wherein the electronic circuitry is configured to stop supplying actuation pulses or to reduce the actuation pulse duration upon determination that the resistive heating element is at or above the threshold operation temperature.

11. The control device according to claim 10, wherein the electronic circuitry is configured to resume supplying of actuation pulses corresponding to a rated current when the ratio ($R_{RATIO}$) falls below the threshold value.

12. The control device according to claim 1, wherein the electronic circuitry comprises a sensor for determining ambient temperature, the sensor being a bandgap device having a forward voltage drop which increases with temperature.

13. The control device according to claim 1, wherein the electronic circuitry comprises a data storage device for storing electrical data of the resistive heating element, the electrical data stored including its resistance value at a base temperature and its temperature coefficient of resistance; and/or wherein the electronic circuitry comprises a data storage device for storing operation data, the operation data including a target operation temperature of the heating element; and wherein the electronic circuitry is configured to set the threshold temperature based on the target temperature.

14. The control device according to claim 1, wherein the electronic circuitry is configured to detect identification of the flavor source, to retrieve stored electrical data and operational data of the resistive heating element, and to set the threshold temperature using the stored data.

15. An electronic cigarette comprising a thermally insulated main housing and a control device, wherein the electronic cigarette comprises a packaged flavor source having a built-in heating element, the heating element comprising a heating resistor (R2), wherein the control device comprises electronic circuitry which is configured to control operation of the resistive heating element; wherein the electronic circuitry is configured:

to supply an actuation power from a first power supply circuit to the heating element via a first path (131) and a first terminal (141);

to transmit a reference signal having a reference voltage ($V_{REF}$) to the heating element via the first terminal (141) and a second path (133) and to receive a responsive signal having a responsive voltage ($V_{OUT1}$) at the first terminal (141) when the first path is electrically isolated from the first power supply circuit, wherein the responsive voltage is a fraction equal to a ratio ($R_{RATIO}$) of the responsive voltage ($V_{OUT1}$) to the reference voltage ($V_{REF}$); and to determine whether the resistive heating element is at a threshold operation temperature with reference to the ratio.

16. The electronic cigarette of claim 15, wherein the flavor source comprises a first terminal (121), a second terminal (123) and a third terminal (125), wherein the heating element interconnects the first terminal (121) and the second terminal (123), wherein the third terminal (125) is connected to an identification resistor, and wherein the electronic circuitry is configured to obtain identification information from the identification resistor when the flavor source is actuated for the first time.

17. The electronic cigarette of claim 16, wherein the identification resistor has one end which is connected to an end of the heating element and one end which is connected to the second terminal (123), the second terminal (123) being configured for connection to the circuit ground.

18. A control method for controlling operation of an electronic cigarette, wherein the electronic cigarette comprises a packaged flavor source having a built-in heating element, the heating element comprising a heating resistor (R2), wherein the control device comprises electronic circuitry which is configured to control operation of the resistive heating element; wherein the method comprising the electronic circuitry operating:

to supply an actuation power from a first power supply circuit to the heating element via a first path (131) and a first terminal (141);

to transmit a reference signal having a reference voltage ($V_{REF}$) to the heating element via the first terminal (141) and a second path (133) and to receive a responsive signal having a responsive voltage ($V_{OUT1}$) at the first terminal (141) when the first path is electrically isolated from the first power supply circuit, wherein the responsive voltage is a fraction equal to a ratio ($R_{RATIO}$) of the responsive voltage ($V_{OUT1}$) to the reference voltage ($V_{REF}$); and to determine whether the resistive heating element is at a threshold operation temperature with reference to the ratio.

19. The method of claim 18, wherein the method comprises the electronic circuitry operating an ADC to obtain the ratio at the first terminal (141), wherein the ADC has an analog signal input (AIN) which is configured to take voltage readings at the first terminal (141), and wherein the ADC is configured to receive a responsive signal having a responsive voltage which is between a maximum value equal to the reference voltage ($V_{REF}$) and a minimum value equal to zero volt.

20. The method of claim 18, wherein the method comprises an initialization process when the flavor source is installed, the initialization process including the electronic circuitry operating to obtain electrical data of the resistive heating element, the electrical data stored including its resistance value at a base temperature and its temperature coefficient of resistance.

* * * * *